United States Patent
Mimun et al.

(10) Patent No.: US 12,138,795 B2
(45) Date of Patent: Nov. 12, 2024

(54) ANALYTICS TO INCREASE PERFORMANCE OF ROBOTIC PROCESS AUTOMATION SOLUTIONS

(71) Applicant: NICE LTD, Ra'anana (IL)

(72) Inventors: Simone Mimun, Givath Shmuel (IL); Adi Levinshtein, Zur Izhak (IL); Yuval Shachaf, Even Yehuda (IL)

(73) Assignee: NICE LTD, Ra'anana (IL)

( * ) Notice: Subject to any disclaimer, the term of this patent is extended or adjusted under 35 U.S.C. 154(b) by 579 days.

(21) Appl. No.: 17/562,312

(22) Filed: Dec. 27, 2021

(65) Prior Publication Data

US 2023/0202033 A1    Jun. 29, 2023

(51) Int. Cl.

| B25J 9/16 | (2006.01) |
|---|---|
| B25J 13/06 | (2006.01) |
| G06F 8/41 | (2018.01) |
| G06F 8/75 | (2018.01) |
| G06F 8/77 | (2018.01) |

(52) U.S. Cl.
CPC ............ *B25J 9/163* (2013.01); *B25J 13/06* (2013.01); *G06F 8/443* (2013.01); *G06F 8/75* (2013.01); *G06F 8/77* (2013.01)

(58) Field of Classification Search
CPC . B25J 9/163; B25J 13/06; G06F 8/443; G06F 8/75; G06F 8/77
See application file for complete search history.

(56) References Cited

U.S. PATENT DOCUMENTS

| 10,120,656 B1 * | 11/2018 | Singh ................... G06F 11/3616 |
| 2018/0370033 A1 * | 12/2018 | Geffen ..................... G06F 16/00 |
| 2020/0180148 A1 * | 6/2020 | S Nanal .............. G05B 19/0423 |
| 2021/0110318 A1 * | 4/2021 | Singh ...................... G06Q 10/04 |

FOREIGN PATENT DOCUMENTS

EP    3675008 A1 *    7/2020    .......... G06F 11/3438

OTHER PUBLICATIONS

Leopold et al., "Identifying Candidate Tasks for Robotic Process Automation in Textual Process Descriptions" (Year: 2018).*
Choi et al. "Candidate Digital Tasks Selection Methodology for Automation with Robotic Process Automation" (Year: 2021).*
Abdelkader et al., "Impact of robotic process automation in supply chain: A model for task selection" (Year: 2021).*

* cited by examiner

*Primary Examiner* — Phillip H Nguyen
(74) *Attorney, Agent, or Firm* — Haynes and Boone, LLP

(57) ABSTRACT

A system is provided for an automation tool system that is adapted to analyze data structures for robotic process automation (RPA) solutions. The system includes a processor and a computer readable medium operably coupled thereto, to perform operations which include receiving a data structure for an automated computing task for the RPA solutions of a computing system, wherein the data structure comprises one or more computing assets for one or more data processing workflows, parsing the data structure, accessing rule scoring parameters for determining a set of best practices identified for construction of the automated computing task for the RPA solutions of the computing system, scoring the automated computing task for the RPA solutions for the computing system based on the parsing and the rule scoring parameters, and outputting, based on scoring the automated computing task, a score of the automated computing task for the data structure.

20 Claims, 9 Drawing Sheets

Data Table 502

| Sr. No. | Practice Name | Decay Rate | Threshold |
|---|---|---|---|
| 1. | Unused UDF | 2 | 10 |
| 2. | Open Tabs | 0.5 | 5 |
| 3. | Number of Callouts | 2 | 10 |
| 4. | Number of SEs | 2 | 15 |
| 5. | Number of Variables | 2 | 25 |
| 6. | User Types Interconnected | 2 | 3 |
| 7. | Steps Overloaded | 1 | 20 |
| 8. | Number of Workflows | 1 | 15 |
| 9. | EHs w/o Actions | 1 | 0 |
| 10. | Unused SEs | 2 | 2 |
| 11. | Empty UDFs | 1 | 0 |
| 12 | Unused Variables | 1 | 2 |
| 13. | Workflows w/o Steps | 1 | 0 |

FIG. 5

ANALYTICS TO INCREASE PERFORMANCE OF ROBOTIC PROCESS AUTOMATION SOLUTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to robotic process automation (RPA) solutions for repetitive computing tasks, and more specifically to a system and method for parsing and analyzing data processing workflows for computing assets to identify best practices during creation of RPA solutions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A computing device, such as a client device, may be used by a user to perform various computing functions through mouse clicks and movements, keyboard and/or touch inputs, and other types of user input. The user may also engage in more complex inputs and/or request specific actions and data processing for computing tasks. These may correspond to repetitive tasks where the user may repeatedly perform actions, which causes increased input and data processing by a computing device and leads to negative user experiences with computing systems, data processing, and corresponding software. Various types of business processes that may be performed with a client device may require multiple different types of inputs and may be repeated with different input data, such as names, businesses, and other information; however, these tasks may repeat certain actions, navigations, general inputs, and other activities. Businesses and other entities may wish to provide robotic automation of these processes and sequences of events so that users are not required to repeatedly perform such actions and tasks. Robotic automation of these repeated processes provides savings in user's time, effort, inputs, and processing resources in addition to other benefits such as error reduction, employee satisfaction, and customer experience improvement. RPA solutions may provide computing tools, operations, scripts, and the like to provide automation of repetitive tasks in applications and/or on computing device. However, RPA solutions are complex, include many variables, functions, and elements, and may have multiple workflows. This may cause RPA solutions to be heavy or processing intensive, which may reduce system performance during runtime.

Conventionally, the existing solutions to optimize RPA merely request that users analyze their workflows, as well as variables, functions, and/or elements in those workflows. Users do not have capabilities within an RPA construction tool to analyze and optimize their RPA solution according to best practices, data processing costs and performance, and/or computing resource consumption. Thus, the ROA construction tool does not assist users in designing RPA solutions to maintain the best practices and quality of the RPA solutions. Users may be unaware of issues during design of an RPA solution that cause performance issues during runtime of the solution. For example, a user may create and/or add, but not use, variables, functions, and/or elements in workflows. The user may also not invoke functions and/or have workflows or event handlers without steps or actions. In order to provide lightweight RPA solutions that minimize processing costs during runtimes and increases performance, it is desirable to present these issues during RPA solution design. Thus, better optimization tools, systems, and methods for reducing processing weight and cost, while increasing automation performance are needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIG. 5 is a block diagram of a data table having parameters for best practice scoring and analytics during generation of RPA solutions according to some embodiments.

DETAILED DESCRIPTION

Figure 1:
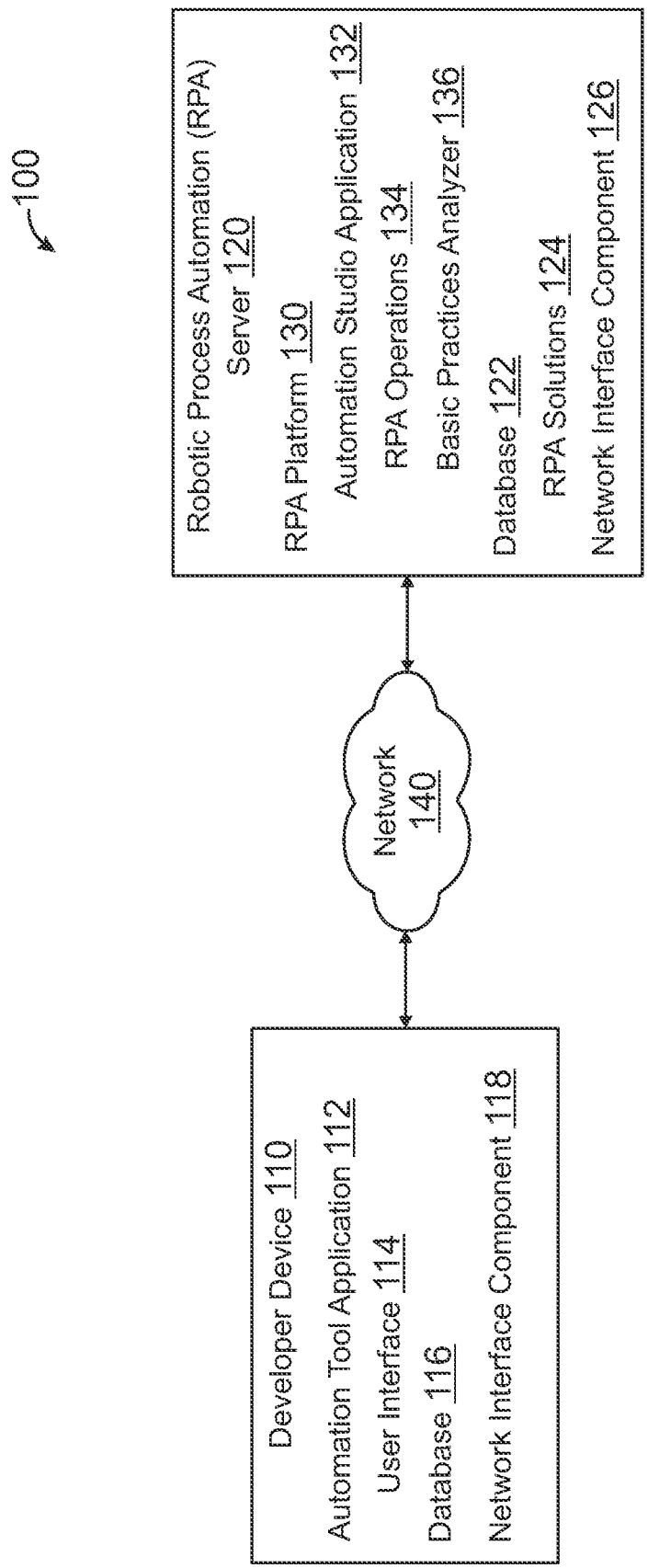
FIG. 1 is a block diagram of an exemplary networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure.

Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For an automation studio tool and application, methods, data structures, and systems are provided for performing analysis of RPA solutions to identify best practices and optimize the RPA solution. Optimization using the best practices may reduce processing cost and resources and improve performance of the RPA solution. An entity may correspond to an actor, such as a person, company, organization, and the like. A database system stores accumulated and extracted data for repetitive tasks, as well as assets and components for workflows used to generate automation scripts, tools, applications, and/or other computing operations for RPA solutions. An RPA solution may therefore correspond to an automation of a computing task performed by a user, examples of which may include automated form filling or data entry, electronic communication handling and delivery, call center bots and scripts for common tasks, and other computing tasks that may be performed by software robotics.

A user may utilize the automation tool to generate an RPA solution to a task, for example, by adding, loading, and/or creating assets within one or more user interfaces used to generate the RPA solution. The user interfaces may allow users to configure and construct RPA solutions using available assets including variables, user defined types, workflows, event handlers, user defined functions, callouts, screen elements, and the like used for RPA of computing tasks. The user may also assign display scale settings of a system and may open different tabs and workflows during RPA solution generation. During generation of an RPA solution, the user may be provided an option and tool to analyze the RPA solution and identify best practices for the RPA solution. This may include scoring the RPA solution based on an algorithm having different weights and values applied to components, assets, and workflows in the RPA solution, as well as providing additional information and alerts.

When analyzing the RPA solution in the automation tool, a data structure may be generated and/or determined for the RPA solution (e.g., at the time of analysis of the RPA solution), which corresponds to an application state in a state container storing the application data for the RPA solution presently in the automation tool. An application programming interface (API) may collect the data for the application state and use the data as input to an algorithm for best practices analyzer having computing operations for scoring the RPA solution. These operations may parse the application state in the data structure and score the RPA solution using the algorithm. For example, the algorithm may cause the best practices analyzer to penalize the score, metrics, and/or other analytics for the RPA solution if certain instances of a practice detected in the RPA solution meet or exceed a threshold number, amount, or volume of the practice.

After analyzing and scoring the RPA solution using the best practices analyzer, one or more user interface pop-ups, windows, interface sections, or interface elements may be displayed having the output of the best practices analyzer. This may include an overall score, which may correspond to a score or value within a range (e.g., 0-100, 0-10, etc., as well as letter grades such as A-F, etc.), and may further include a qualitative measure or descriptor (e.g., excellent, good, fair, poor, etc.). These ranges and descriptors may be configurable, and descriptors may be used to qualitatively describe or identify certain sub-ranges and/or scores. Further, the best practices analyzer may provide identification of performance issues caused by different assets or components of the RPA solution, unused items in the RPA solution, and/or alerts caused by assets and/or configurations of the RPA solution.

Within one or more windows, menus, or options of the best practices analyzer's output, one or more options may be provided to allow the user to view the assets and/or components causing issues with RPA solution optimization. These options may be used to navigate directly to the asset or other component of the RPA solution that is at issue. Further, the options may be used to request deletion of unused assets, workflows, and the like automatically, without the user manually navigating to those assets and/or components and requesting deletion. This may be done through the best practices analyzer without manual efforts and/or configurations of the RPA solution in the automation tool.

The embodiments described herein provide methods, computer program products, and computer database systems for RPA solution optimization through algorithmic analytics and user interface outputs. An automation tool system provides an application having an automation studio that utilizes the computing services described herein. For example, an online system and platform may provide a portal that is accessible by one or more end users, including RPA solution designers, system administrators, and the like, to access one or more user interfaces of a web-based or client software-based application for RPA design and creation of operations to automate a computing task. The application(s) may further provider a best practices analyzer configured to provide analysis and optimization guidance when creating RPA solutions. This allows for more lightweight RPA solutions that increase system and RPA solution performance across different devices, servers, and systems, thus reducing operational costs by providing faster and more coordinated data processing and automation of computing tasks. Further, the user interfaces allow for simplified data displays to provide user friendly and intuitive RPA solution design and analysis, allowing users to move between assets, workflows, and components that may cause performance issues and quickly resolve unused and/or problematic assets, workflows, and/or components. This may be done by minimizing user inputs and navigations while providing automated processes to view, change, and/or delete assets, workflows, and components of RPA solutions. Thus, as part of providing the services to one or more end users, the online system may provide different user interface outputs that allows for simplified and dynamic RPA solution visualizations without sacrificing application tools and operations for RPA solution generation.

According to some embodiments, in an automation tool system accessible by a plurality of separate and distinct users and/or organizations, best practices analyzers are provided for RPA solutions, thereby enhancing the experience of end users during generation of RPA solutions through the automation tool system and corresponding application studio described herein.

Example Environment

The system and methods of the present disclosure can include, incorporate, or operate in conjunction with or in the environment of an RPA tool application, database, and portal, which may include a cloud-based computing architecture. FIG. 1 is a block diagram of an exemplary networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include a developer device 110 and a robotic process automation (RPA) server 120 in communication over a network 140 for data processing and analytics during RPA solution generation using an automation tool framework and/or system. In other embodiments, environment 100 may not have all of the components listed and/or may have other elements instead of, or in addition to, those listed above. In some embodiments, environment 100 is an environment in which RPA solution generation and analysis for best practices is provided. Developer device 110 may be any machine or system that is used by a user to display user interfaces to request and/or perform construction and generation of an RPA solution, as well as request, receive, and display analytics for best practices during RPA solution generation. For example, developer device 110 can be a handheld computing device, a mobile phone, a laptop computer, a notepad computer, a workstation, and/or a network of computing devices. As illustrated in FIG. 1, developer device 110 might interact via network 140 with RPA server 120 to request data from RPA server 120 and process received data for display.

Developer device 110 may be utilized in order to perform RPA solution generation using an RPA platform 130 of RPA server 120, as well as request, receive, and utilize best practices for RPA solution generation. Developer device 110 may utilize an automation tool application 112 to interact with RPA platform 130 of RPA server 120. Automation tool application 112 may correspond to a web browser application or dedicated software application, which may be configured to access and interact with RPA platform 130. User input may be provided via input devices and user interfaces 114 of automation tool application 112 executed by developer device 110. An entity referred to herein may be a person, group of people, a company, an organization and the like, but may more broadly correspond to any type of actor. Developer device 110 may correspond to a device, server, and the like that interfaces with RPA server 120 to utilize the RPA solution generation and optimization via automation studio application 132 of RPA platform 130 in the corresponding computing environment, which may be a cloud computing environment. RPA server 120 may receive requests, actions, activities, and data from automation tool application 112 of developer device 110 and provide services and data for automation studio application 132 to developer device 110 via user interfaces 114, as discussed herein. Automation tool application 112 may provide and display computing services for RPA operations 134 and best practices analyzer 136 of automation studio application 132 via user interfaces 114, which may include tools, assets, components, and the like for RPA solution generation using RPA platform 130.

RPA server 120 may be utilized by different developers, system administrators, and other end users to perform RPA solution generation and optimization using RPA operations 134 and best practices analyzer 136 of automation studio application 132. RPA server 120 may provide access to RPA platform 130 for purposes of RPA solution generation for computing tasks, such as repetitive tasks that may be performed by a workforce of a company, business, or other employment entity. In this regard, automation studio application 132 of RPA platform 130 may include RPA operations 134 and best practices analyzer 136 that may be used by developer device 110 to develop an RPA solution, which may correspond to an automation script, tool, application, executable data package, and/or other computing operations for performing the computing task to be automated in place of manual efforts and input. RPA platform 130 may correspond to a framework and platform (such as a system), including an online portal and/or one or more user interfaces (e.g., user interfaces 114), which may allow users to generate RPA solutions by accessing, loading, and utilizing RPA operations 134 of automation studio application 132 via automation tool application 112 on developer device 110. During RPA solution generation, automation tool application 112 may also request use of, and utilize, best practices analyzer 136 to analyze, identify, and provide best practices, RPA solution scoring, and identification of unused or problematic assets, workflows, and/or other components of an RPA solution.

Best practices analyzer 136 may access a data structure for an RPA solution's application state during creation in automation studio application 132 and and/or from RPA solutions 124 stored to database 122. Database 122 may include RPA solutions 124 previously generated and/or pending during construction in automation studio application 132. The application state may be stored in and/or provided via a state container for the data structure, such as a JavaScript Object Notation (JSON) data container in JSON format having one or more JSON objects for the assets, workflows, and/or other components of the RPA solution. Best practices analyzer 136 may then execute operations to perform algorithmic analysis and determination of best practice analytics and parameters for the RPA solution. After analysis, user interfaces 114 of automation tool application 112 may be used to provide and display one or more user interface elements, windows, popups, menus, and the like for a corresponding output of best practices analyzer 136. An exemplary user interface displaying output scores, best practices, recommendations, and/or identification of unused/problematic assets and workflows are shown further in FIG. 3.

The users of developer device 110 and/or RPA server 120 may differ in their respective capacities, and the capacity of the users using developer device 110 and/or RPA server 120. These capacities might be entirely determined by applications, permissions, and profiles for a current user. For example, where an end user of a company, business, organization, or other entity is using developer device 110 to interact with RPA server 120 to generate and optimize RPA solutions, that user's system has the capacities allotted to that user and those computing events may be associated with a user of an organization. However, where different developers, administrators, managers, or other types of users utilizes developer device 110, such as ones with separate or third-party entities, that user's system has the capacities allotted to that particular type of user and may perform actions associated with that type of user. Thus, different users may have different capabilities, different permissions, and perform different events, with regard to RPA solution generation, scoring, and optimization that may be provided by RPA server 120. Both developer device 110 and RPA server 120 may execute a web-based client that accesses a web-based application for RPA server 120, or may utilize a rich client, such as a dedicated resident application, to access RPA server 120.

Developer device 110 may also typically utilize one or more user interface devices, such as a keyboard, mouse, trackball, touch pad, touch screen, pen and the like, for interacting with a graphical user interface (GUI) (e.g., one or more of user interfaces 114) provided by an application or browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the RPA server 120 or other systems or servers through the web-based or rich client. For example, the user interface device can be used to access data and applications hosted by RPA server 120, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN and the like.

Developer device 110 might communicate via a network interface component 118 with RPA server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Similarly, RPA server 120 may communicate with one or more other computing devices, servers, or other online services, including developer device 110, via a network interface component 126 using the same or similar Internet protocols. In an example where HTTP/HTTPS is used, developer device 110 might include an HTTP/HTTPS client commonly referred to as a "browser" for sending and receiving HTTP//HTTPS messages to and from an HTTP//HTTPS server, such as RPA server 120. Such an HTTP/HTTPS server might be implemented as the sole network interface between developer device 110, RPA server 120, and/or external or third-party devices, servers, and/or data sources, but other techniques might be used as well or instead. In some implementations, the interface between developer device 110 and RPA server 120 includes load-sharing functionality.

Developer device 110 and RPA server 120 may utilize network 140 to communicate with each other, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, RPA server 120 is configured to provide webpages, forms, applications, data, and media content to developer device 110 and/or to receive data from developer device 110, including requests, configurations, asset or workflow additions and/or deletion, interactions, activities, and/or other data during RPA solution generation and optimization using RPA operations 134 and best practices analyzer 136. As such, RPA server 120 provides security mechanisms to keep data secure. Additionally, the term "system" is meant to include a computer system and/or server(s), including processing hardware and process space(s), and an associated storage system and database application (e.g., object-oriented data base management system (OODBMS) or relational database management system (RDBMS)). It should also be understood that "server system" and "system" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, automation tool application 112 of developer device 110, shown in FIG. 1, may correspond to the applications and API services that provide user interfaces 114 (web browser, desktop application, etc.) for a user (e.g., an organization and/or member of the organization) to interact with RPA server 120. RPA server 120 may provide RPA platform 130 and/or execute automation studio application 132 to interact with automation tool application 112. For example, in one embodiment, RPA server 120 includes application servers configured to implement and execute software applications as well as provide related data, code, forms, webpages, and other information associated with automation studio application 132, and to store to, and retrieve from, a database system related data, objects, and web page content associated with automation studio application 132. For example, RPA server 120 may implement various functions of automation studio application 132, and the processing space for executing system processes, such as running applications as part of automation studio application 132. Additional processes that may execute on RPA server 120 include database indexing processes associated with data and requests received from developer device 110.

Several elements in the system shown in FIG. 1 include elements that are explained briefly here. For example, developer device 110 could include a desktop personal computer, workstation, laptop, notepad computer, PDA, cell phone, or any wireless access protocol (WAP) enabled device or any other computing device capable of interfacing directly or indirectly to the Internet or other network connection. Developer device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, and the like. According to one embodiment, each of developer device 110 and/or RPA server 120 and all of its components are configurable using applications including computer code run using one or more central processing unit such as an Intel Pentium® processor and the like. Similarly, RPA server 120 and all of their components might be operator configurable using application(s) including computer code to run using a central processing unit, which may include an Intel Pentium® processor and the like, and/or multiple processor units. In this regard, RPA server 120 may be provided and/or performed by a greater number of devices and/or servers to form a cloud-based environment to provide online services to cloud computing tenants through cloud computing and cloud-based service delivery. This cloud computing environment therefore may provide and/or improve data processing, storage, and retrieval through networked servers and devices forming the cloud computing environment. A computer program product embodiment includes a machine-readable storage medium (or media) having instructions stored thereon/in which can be used to program a computer to perform any of the processes of the embodiments described herein utilizing one or more computing devices.

Computer code for operating and configuring developer device 110 and/or RPA server 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 of developer device 110 and/or database 122 of RPA server 120, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, database 116 and/or database 122 may store application and system data associated with providing and administering automation tool application 112 and/or automation studio application 132, respectively. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Automation Tool and Studio Application Environment

Figure 2A:
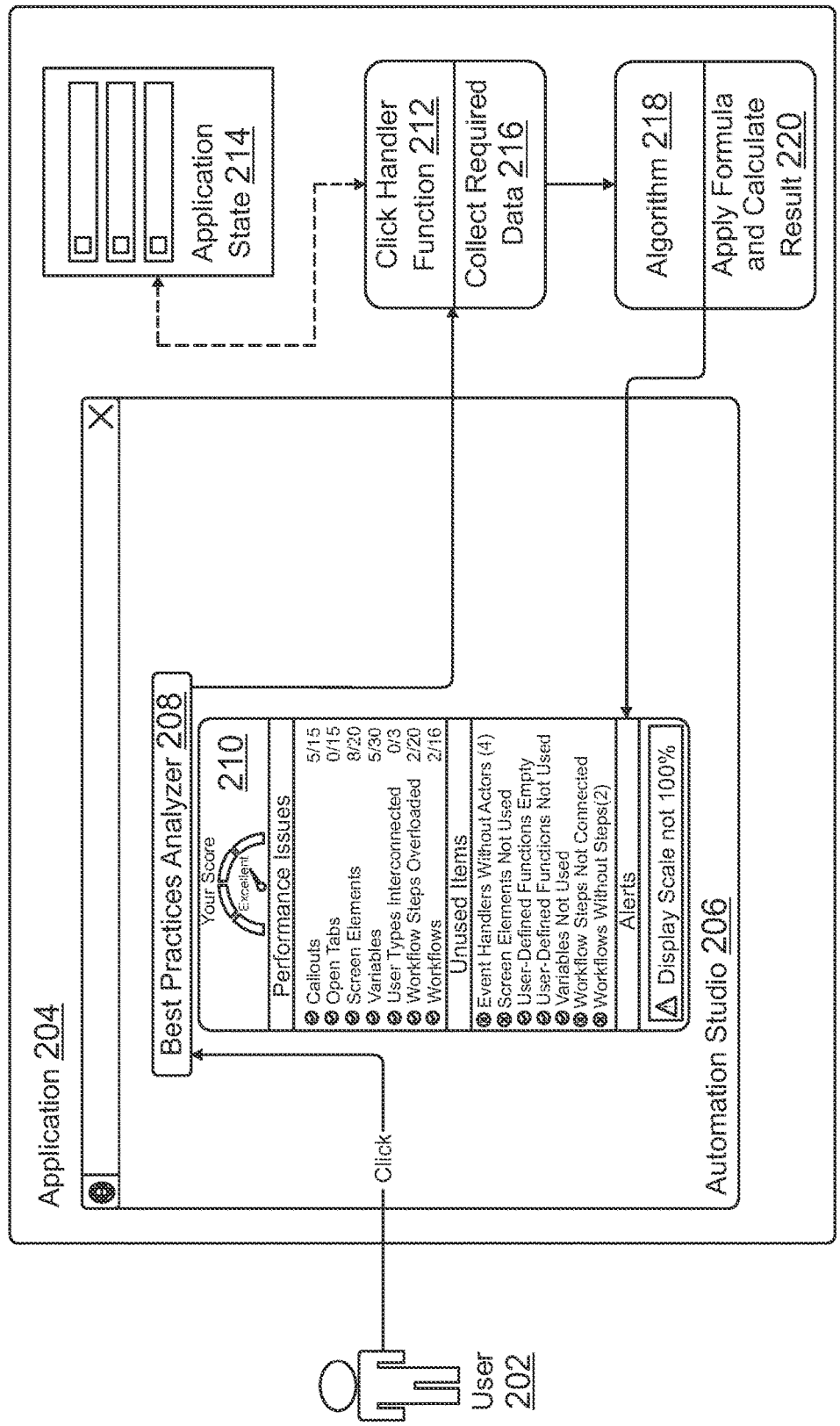
FIGS. 2A-2B are simplified diagrams of operations to present a user interface identifying best practices when performing RPA for repetitive tasks according to an embodiment.
Figure 2B:
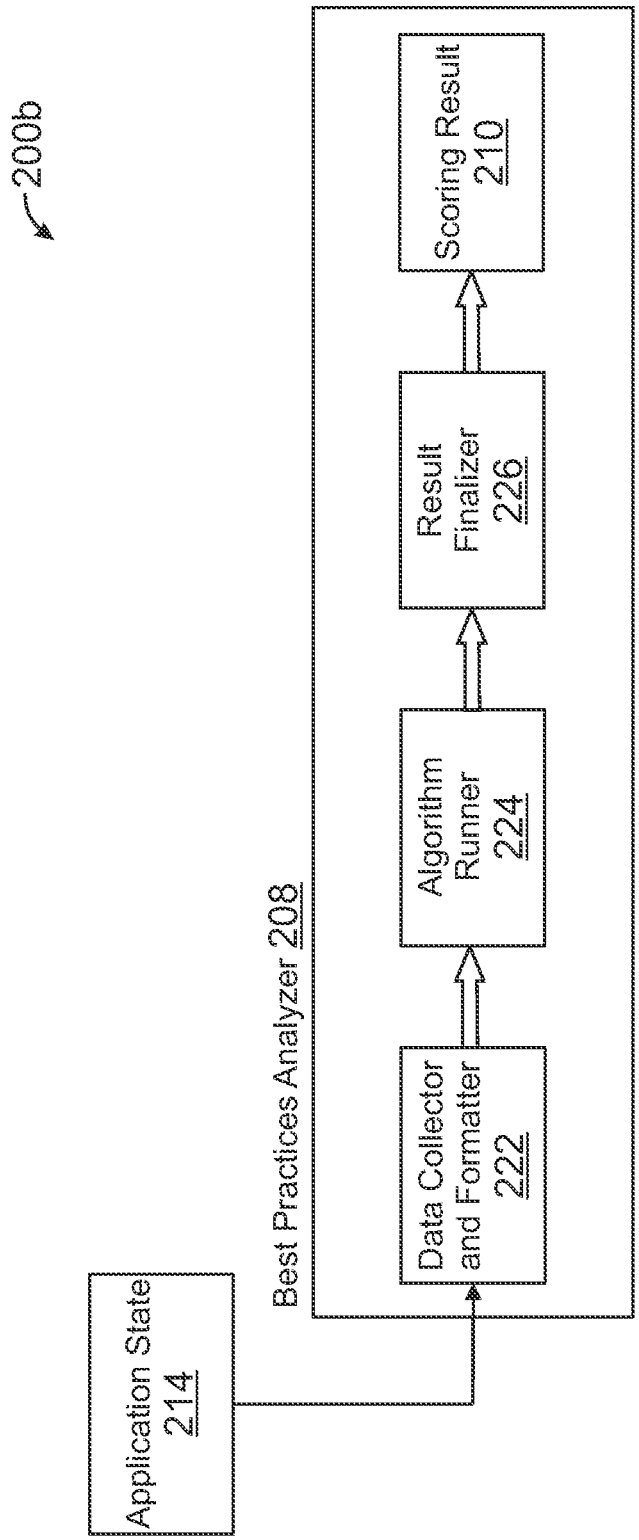

FIGS. 2A-2B are simplified diagrams 200a and 200b of operations to present a user interface identifying best practices when performing RPA for repetitive tasks according to an embodiment. Diagram 200a of FIG. 2A includes a user viewing an application 204 displayed by developer device 110 of the user in response to data received from RPA server 120 discussed in reference to environment 100 of FIG. 1. In this regard, diagram 200b displays the components of a best practices analyzer 208 for an automation studio 206 in diagram 200a, which may be used to output a scoring result 210 during RPA solution generation for a computing task.

In diagram 200a, user 202 may initially request execution of best practice analyzer 208 in application 204 via an input, such as a mouse click event with an icon, menu, button, or other interface element for best practices analyzer 208 (e.g., an element representing and causing execution of best practices analyzer 208 in a user interface). Application 204 may correspond to a web browser or dedicated software application that may access a website or other online resource and provide operations to create, deploy, utilize, and/or download RPA solutions for computing tasks, such as tasks that may be identified as repetitive based on multiple usages by one or more users and/or a workforce. Best practices analyzer 208 may be provided in automation studio 206, for example, during generation of one or more RPA solutions using different assets and workflows including variables, user defined types, user defined functions, workflows, event handlers, screen elements, callouts, open tabs for workflow creation, system display scale settings, and other components or attributes for RPA solution generation.

Responsive to user 202 clicking on or otherwise activating best practices analyzer 208, scoring results 210 may be displayed after calculation by the operations of best practices analyzer 208. In this regard, a click handler function 212 or other operation may process the mouse click or other input event activating best practices analyzer 208. This initiates an operation to determine the application state, which may be cached or stored in-memory for application 204. In this regard, the in-memory cache for application 204 may store application state 214 and/or one or more additional application states while application 204 is live and active. However, the in-memory cache may be destroyed and/or deleted on application close or exit. However, other more persistent (e.g., semi-persistent or persistent caches that may continue after application close or exit) may also be used where an application state of application 204 having the RPA solution generated in automation studio 206 is required to be stored for an amount of time, such as for further analytics after application close and/or during another application instance.

When responding to click handler function 212 to obtain application state 214 in-memory for application 204, RPA server 120 and/or another server, system, or device, may determine the application state as a data structure storing application data for an RPA solution being constructed and/or generated in automation studio 206. This may correspond to a state container having the application data, for example, in JSON format. In this regard, RPA server 120 may return a JSON structure and/or container having JSON objects for different assets and/or workflows of the RPA solution. Automation studio may utilize a state management tool such as Redux, to store application state 214 in the JSON format, which may be updated and modified as changes are made to the RPA solution in automation studio 206 of application 204. Other formats and/or data structures may also be utilized. Best practices analyzer 208 may be opened and executed by user 202 during the design and/or review phase of the RPA solution to determine the quality and optimization of the RPA solution based on lightweight processing goals and performance enhancement.

Required data 216 is collected including application state 214, as well as any weights, values, or the like utilized for the algorithmic operations to calculate and determine scoring results 210. Required data 216 is then provided to algorithm 218, which may correspond to a set of operations to apply the algorithm discussed herein to determine scoring results 210. Algorithm 218 may be used to calculate a final score and validate the provided data for application state 214. This allows overall scoring of the solution, as well as identification of performance issues, unused items, and alerts.

In diagram 200b, formula application and result calculation 220 is shown in further detail. For example, application state 214 is provided as input to best practices analyzer 208. Best practices analyzer 208 may utilize a data collector and formatter 222 to collect a count of the assets, workflows, and/or instances for all the best practices. Application state 214 is used to derive and determine input to algorithm 218 for calculation of scoring results 210. In this regard, application state 214 includes all the assets created by the user for the RPA solution, where each asset is stored and updated on a corresponding node that allows updating and deletion of the asset. Application state 214 therefore provides a current state of automation studio 206 in application 204 at a given time when best practices analyzer 208 is run.

Data collector and formatter 222 further adds a predefined threshold and decay rate into the data for each practice. For each practice, data collector and formatter 222 may have a corresponding JSON object, which may contain a number of instances, a decay rate, and a threshold. The number of instances is the count of instances a user has created for a corresponding asset or workflow. In further embodiments, the number of instances may correspond to the instances that exist according to the corresponding practice in the solution (e.g., the number of variables, number of workflows, number of unused variables, etc.). The decay rate is used to exponentially penalize a practice when a threshold is violated or exceeded. The threshold corresponds to an allowable count of instances of an asset or workflow, where once the count of instances meets or exceeds the threshold, algorithm 218 may begin to penalize the practice for the corresponding RPA solution, thereby decreasing a score and/or providing alerts for additional attributes or parameters of scoring result 210. With application state 214, data collector and formatter 222 may transform the data collected from application state 214 into a minimal required data and format, such as by standardizing to a specific data format and data tables used by best practices analyzer 208.

Using the formatted data for application state 214, an algorithm runner 224 may correspond to a set of operations where the algorithm described herein is applied on the formatted data and a final score is calculated. The algorithm, scoring, and weights for algorithm runner 224 are discussed in further detail with regard to FIGS. 4A and 4B herein. Algorithm runner 224 may then pass the score and additional elements (e.g., performance issues, unused items, alerts, etc.) to result finalizer 226, which may finalize the results for best practices analyzer 208 according to the score and additional elements or parameters determined by algorithm runner 224 using the formatted data. Result finalizer 226 then provide a data output through a user interface having scoring result 210. Scoring result 210 allows user interactions, for example, to view and navigate to performance issues, unused items, and/or alerts (e.g., via selectable links). Further, the user interface displaying scoring result 210, as well as the user interactions to navigate to unused items, may allow for automatic deletion of unused items (e.g., assets, components, and/or workflows of RPA solutions).

Figure 3:
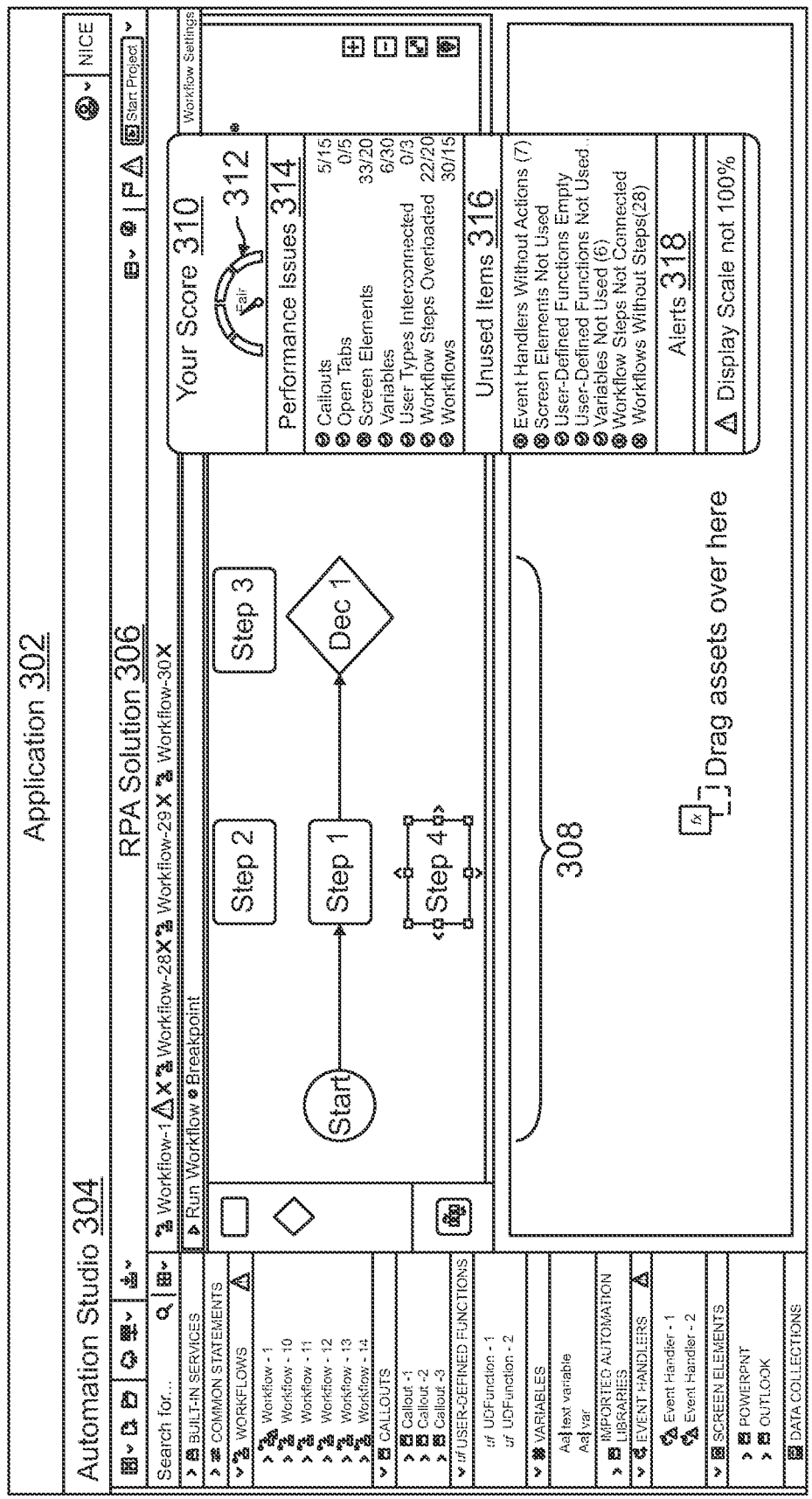
FIG. 3 is an exemplary user interface displaying an RPA solution and scoring for best practice analytics during RPA solution generation according to some embodiments.

FIG. 3 is an exemplary user interface 300 displaying an RPA solution and scoring for best practice analytics during RPA solution generation according to some embodiments. User interface 300 of FIG. 3 may be displayed by a computing device during RPA of a computing task to generate a solution that may be deployed to automate the computing task on computing devices, servers, and/or systems. Thus, user interface 300 may be displayed by developer device 110 when utilizing RPA solution generation and optimization tools of RPA server 120.

In user interface 300, an application 302 is shown having an automation studio 304 that may be used for RPA of computing tasks (e.g., data entry, navigations, application commands, desktop events and inputs, and the like). A user may utilize automation studio 304 of application 302 to generate an RPA solution 306 for a task that the user wishes to automate and deploy with one or more computing systems for RPA. RPA solution 306 includes assets 308 in a workflow, where RPA solution 306 may include one or more workflows for automation of the tasks. A workflow may correspond to a diagram identifying the assets, their relationships, and execution steps to perform one or more tasks or operations using the assets and steps of the workflow diagram. Thus, assets 308 may include variables, user defined types, user defined functions, workflows, event handlers, callouts, screen elements, and the like. RPA solution 306 may also include other components and parameters, such as a number of open tabs for workflows during RPA solution creation, system display scale settings, and the like.

Figure 4A:
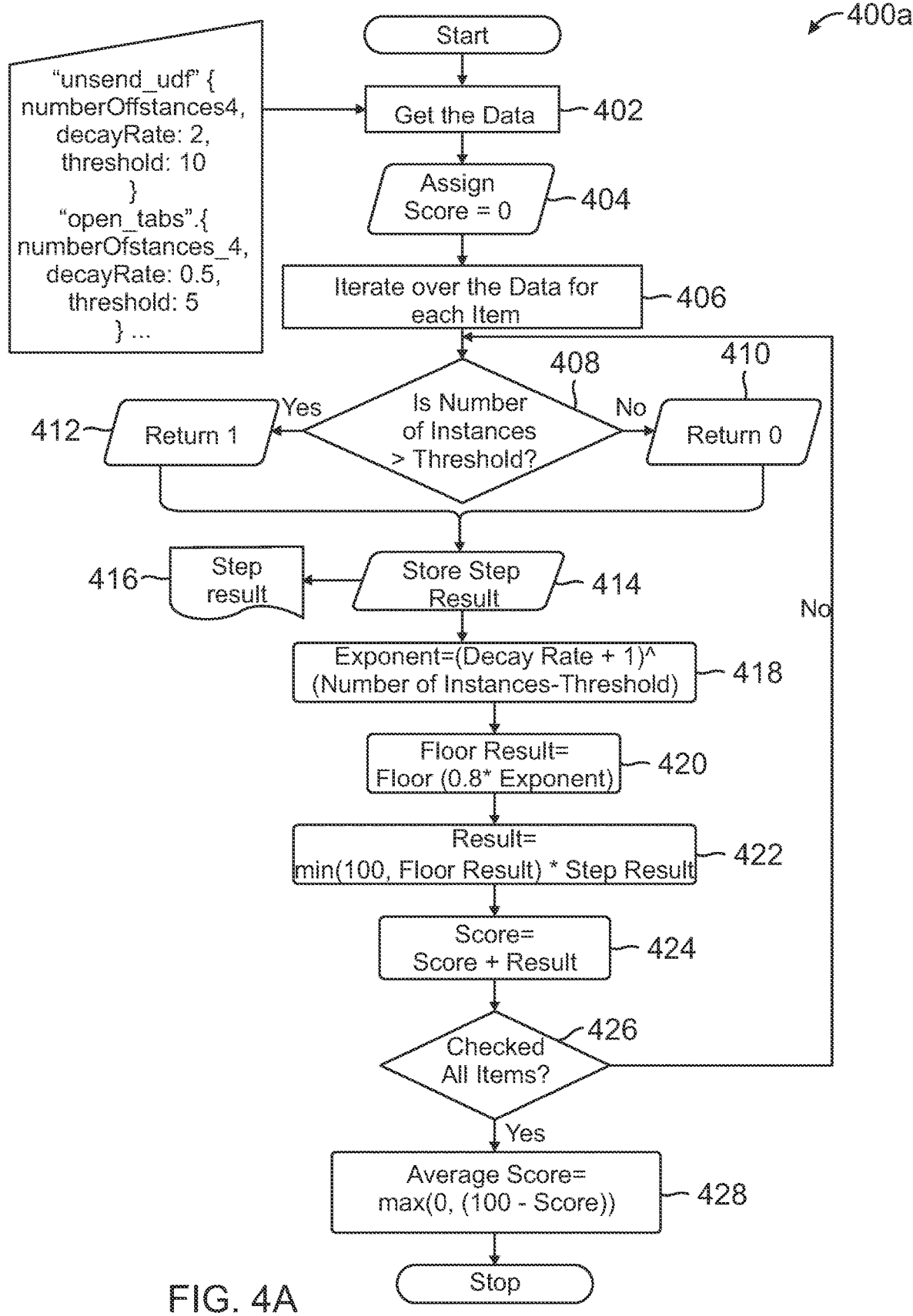
FIGS. 4A-4B are simplified diagrams of flowcharts for best practice scoring and analytics during generation of RPA solutions according to some embodiments.
Figure 4B:
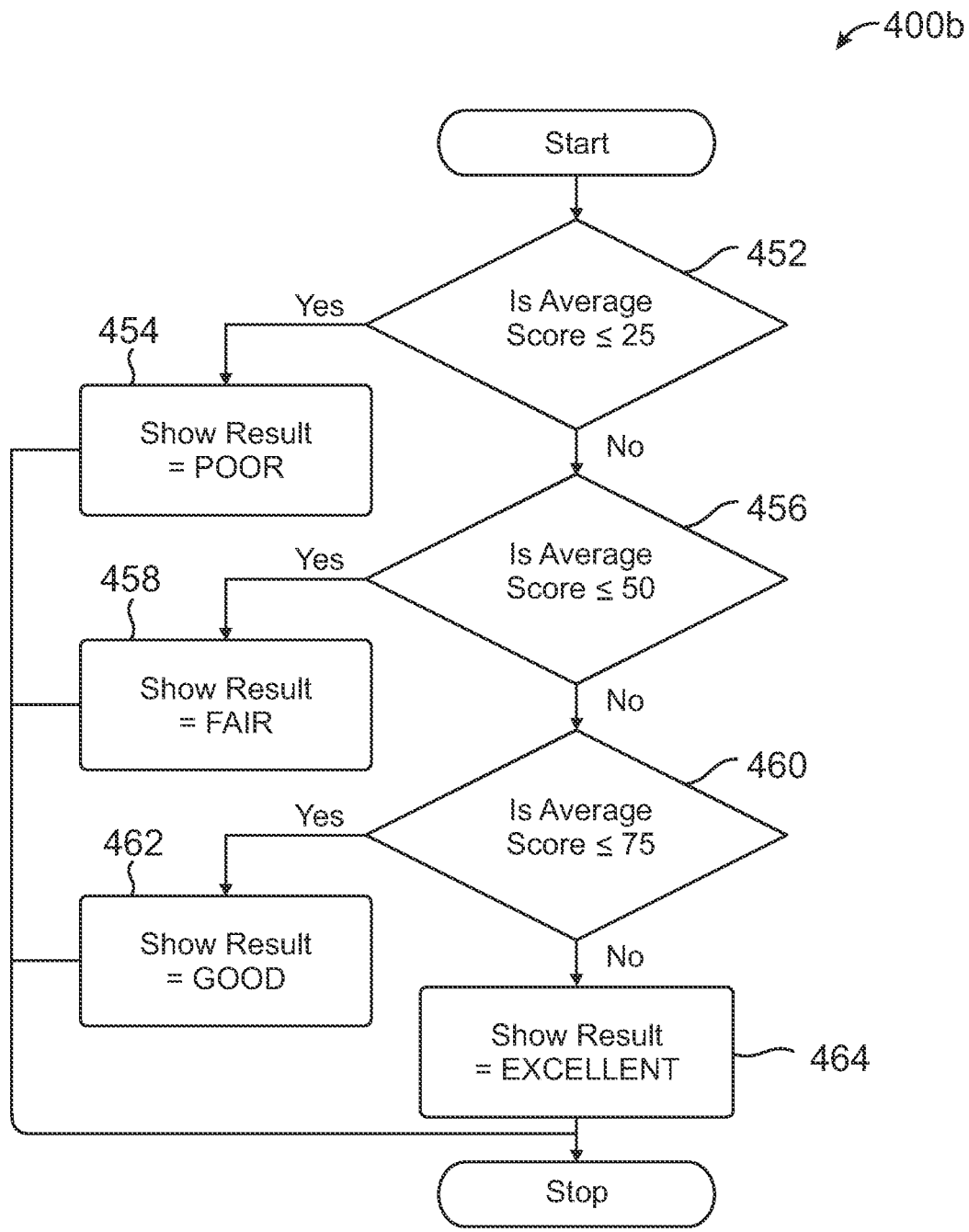

A best practices analyzer using algorithmic operations, as discussed in further detail with regard to FIGS. 4A-4B, may take an application state (e.g., a data structure for a state container having the application data) as input, and provide RPA solution analytics 310 in user interface 300. For example, in automation studio 304 of application 302, RPA solution analytics 310 may be displayed as a pop-up window, window within automation studio 304, or another displayable interface element or feature. RPA solution analytics 310 includes a score 312 based on the algorithmic output of the best practices analyzer after parsing RPA solution 306 and calculating the score. RPA solution analytics 310 may further display any additional elements, attributes, or parameters (e.g., performance issues, unused items, alerts, etc.) determined for RPA solution 306 using the algorithm and operations of the best practices analyzer. Score 312 may be broken into quadrants, where each quadrant is assigned a range within the overall scoring range of 0-100, as well as a qualitative label or measure (e.g., excellent, good, fair, poor for four quadrants). For example, an excellent score may range from 76-100, a good score from 51-75, a fair score from 26-50, and a poor score below 25 (e.g., 0-25).

RPA solution analytics 310 further includes performance issues 314, such as those assets and/or workflows, as well as the usage and/or construction of RPA solution 306 using those assets and/or workflows, that meet or exceed the thresholds, rules, weights, and the like utilized during calculation of score 312 using the algorithm of the best practices analyzer. In this regard, performance issues may identify a threshold, cap, or baseline of allowable assets, workflows, or components in RPA solution 306, after which, RPA solution 306 may be penalized for use (e.g., as implementing a bad practice and not adhering to the established best practices). A threshold for a practice may correspond to a threshold number, amount, or volume of assets before penalization, and performance issues 314 may display the threshold with a number of current assets, workflows, or components in RPA solution 306. This allows a user to view any violations of the thresholds, which may further include links, navigations, or operations to be redirected or routed to those violations. Performance issues 314 may be associated with callouts, user defined functions, open tabs, external callouts to external data, screen elements, a number of variables, interconnected user types, overloaded workflow steps, a number of workflows, or other RPA solution features that may affect performance during runtime.

Unused items 316 may also be displayed in RPA solution analytics 310. Unused items 316 are those assets and workflows in RPA solution 306 that are not used and/or do not have a relationship and/or functionality with another item (e.g., another asset or workflow). For example, a workflow may be accidentally opened and not used, or a variable may be placed but not connected to another asset. Unused items 316 may include, e.g., event handlers without associated actions, screen elements not used, user defined functions that are empty and/or not used, variables that are placed or invoked but not used, workflow steps that are not connected, and/or workflows without steps. Additional analytics for other assets, workflows, and/or other components for RPA solution generation that go unused in RPA solution 306 may also be detected and displayed in RPA solution analytics 310.

Alerts 318 may correspond to other assets, components, or parameters that may otherwise affect performance of RPA solution 306 and/or cause higher processing load and resource usage when RPA solution 306 is executed by a computing system. This may include open and/or unused tabs and a system display scale setting or size (e.g., too large of a display setting), which may affect performance. Thus, alerts 318 may assist in resolving additional factors that may cause higher data processing costs to provide a more lightweight solution. Determination of the data for RPA solution analytics 310 is discussed in further detail with regard to FIGS. 4A-4B.

FIGS. 4A-4B are simplified diagrams of flowcharts 400a and 400b for best practice scoring and analytics during generation of RPA solutions according to some embodiments. In some embodiments, the algorithm flow described in flowchart 400a of FIG. 4A and/or the result finalization flow described in flowchart 400b of FIG. 4B can be implemented and performed using RPA server 120 from environment 100 of FIG. 1. In this regard, in flowcharts 400a and 400b, RPA server 120 may execute processing logic and code to calculate and output a score and additional best practices information via one or more of user interfaces 114 of developer device 110 in environment 100.

Flowchart 400a begins at step 402 where data is obtained for the corresponding RPA solution in response to execution of a best practices analyzer. An API of the application and/or service provider that provides an automation studio for RPA solution generation and/or best practices analytics may collect data on the application state, such as by reading from current data in the application for the automation studio. The API may have a JSON format state container with JSON objects for assets created. In order to process the application state and determine the best practices for RPA solution generation, each practice for the best practices analyzer may be formatted for a JSON container or other data structure.

For each practice, the JSON container includes JSON objects having a number of instances of the asset or workflow in the RPA solution being analyzed, a decay rate for exponentially penalizing violations (e.g., excess assets or workflows meeting or exceeding the threshold), and a threshold number of allowable assets or workflows before penalization. Thus, the data may be contained in a data structure associated with the assets, workflows, and parameters, weights, and/or thresholds of the best practices algorithm.

At step 404, the practices from the data structure of the application state and algorithm inputs are analyzed, where an initial score overall, and for each practice, is set to zero. At step 406, for the best practices, the best practices analyzer iterates over the data for each item, such as by parsing the data for a number of assets/workflows for each practice. For a first exemplary one of the practices, at step 408 it is determined whether the number of instances exceeds the threshold (which may include meeting the threshold in some embodiments where penalization may occur at that trigger condition). For example, the data structure of the RPA solution may be parsed and/or analyzed to determine a number of invoked assets, workflows, features, components, or other instances for a particular practice. This may be compared to the threshold obtained at step 402 and if the number of instances does not exceed the threshold, then a step result of zero is returned at step 410. However, if the threshold is exceeded, a step result of one is returned at step 412. At step 414 the step result from either step 410 or step 412 is stored, and at step 416, that step result is persisted to at least an in-memory cache for the application and/or a short-term, semi-persistent, or persistent cache of the service provider's server.

At step 418, the algorithm is invoked to calculate and determine a score of the RPA solution, which may correspond to a score, value, or other quantifier (as well as a qualitative measurement, as shown in flowchart 400b) that indicates best practice usage and/or adherence. The algorithm for score calculation is shown in Equation 1:

$$\text{score} = \max(0, 100 - \sum_{k=0}^{n} \min(\text{floor}(a(1+r)^{x_k - thresh_k}), 100) * \text{step}(thresh_k)) \quad \text{Equation 1}$$

Where:
a=initial growth, e.g. 0.5
r=decay rate, e.g. 0.5, 1, 2, etc.
$x_k$=count of instances of a bad practice type k, e.g., 3 instances.
$thresh_k$=threshold from which score is penalized e.g. 3/10 (where 10 is the threshold) instances are allowable and will not be penalized; however, a penalty starts once exceeding 10 instances.
n=number of practices
step($thres_k$)={0 if r<$thres_k$, 1 if r≥$thres_k$})—a step function for the threshold from which the penalty is started.

Thus, at step 418, an exponent for Equation 1 is calculated by taking the decay rate plus one raised to the number of bad instances minus the threshold. At step 420, the number is set to a floor where the exponent result from step 418 is multiplied by 0.8. Although 0.8 is used in flowchart 400a, other factors and/or coefficients may be used during step 420. At step 422, a result is determined by taking the minimum between one hundred and the floor result and multiplying by the step result stored at step 416. Thus, if the step result from step 410 is equal to zero (e.g., the threshold of allowable instances for a bad practice was not exceeded), the result at step 422 would equal zero. However, if the step result from step 412 is equal to one (e.g., the threshold of allowable instances for the bad practice was exceeded), the result at step 422 will equal the minimum of one hundred or the floor result from step 420. Thus, the penalty may not exceed one hundred for an individual practice.

At step 424, the score is calculated by adding up the penalties from each practice, such as a penalty calculated when identifying a usage number or volume of a user defined function, an open tab in the data structure, an external callout to external data, a screen element, a number of variables, an interconnected user type, an overloaded step, a number of workflows, an event handler without associated actions, and other practices for use of assets and workflows. At step 426, it is determined if all items for the best practices analyzer have been checked and scores calculated. If not, flowchart 400a returns to step 408 and further iterates over the data to determine a number of instances and compare to a threshold for another practice. However, if so, flowchart 400a proceeds to step 428, where an average final score of the RPA solution is calculated. The final score may be equal to a maximum of zero, or one hundred minus the score of the sum and/or averaged total of all practices' scores. Thus, the final score may not be lower than zero, and may range from zero to one hundred. In other embodiments, other ranges and/or scores may be used. Output of the score and further information is shown in flowchart 400b.

In flowchart 400b, it is first determined whether the average final score from step 428 of flowchart 400a is less than or equal to 25. If yes, flowchart 400b proceeds to step 454 where a result is shown as poor. For each of the steps in flowchart 400b, a corresponding gauge or meter and descriptor may be output. For example, RPA solution analytics 310 include score 312 that shows a gauge from 0-100 (e.g., in similar fashion to a speedometer or other meter gauge), which may show a needle indicating a score and/or a color marking or other highlight/indicator, as well as a qualitative measure or descriptor. Thus, when outputting "Poor" at step 454, the word "Poor" may be provided with a needle gauge pointing to the score from 0-25 and a corresponding color or other indicator may be displayed. Similarly, the other steps of flowchart 400b may also show a corresponding indication on a gauge with a corresponding descriptor within an interface element, window, or the like that may correspond to RPA solution analytics 310 and/or score 312.

However, if the average score is above 25, flowchart 400b proceeds to step 456, where it is determined whether the average score is less than or equal to 50. If so, flowchart 400b proceeds to step 458, where a result is shown as fair, and a corresponding gauge and descriptor are shown to a user via a user interface. If the average score is above 50, flowchart 400b proceeds to step 460, where it is determined whether the average score is less than or equal to 75. If so, flowchart 400b proceeds to step 462 where a result is shown as good, and a corresponding gauge and descriptor are shown to a user via a user interface. However, if the score is above 75, flowchart 400b proceeds to step 464, where a result is shown as excellent, and a corresponding gauge and descriptor are shown to a user via a user interface.

FIG. 5 is a block diagram 500 of a data table having parameters for best practice scoring and analytics during generation of RPA solutions according to some embodiments. Diagram 500 of FIG. 5 includes a data table of practices that may be used to identify when best practices for RPA solution generation have been violated (e.g., resulting in bad practices during RPA solution generation) by RPA server 120 discussed in reference to environment 100 of FIG. 1. Violation of best practices may be caused by utilizing assets and/or workflows that unnecessary consume or utilize processing resources and cause performance issues during runtime. In this regard, diagram 500 displays types of practices, their corresponding decay rates for exponential penalization, and thresholds of allowable instances of that practice before penalization.

In diagram 500, exemplary practice types are shown that may be used when calculating a score using the algorithm and flow discussed in reference to FIGS. 4A-4B. In this regard, a data table 502 may include rows for different practices, where each column corresponds to a different parameter or attribute of the practice. For example, each practice may have a serial number 504, a practice name 506, a decay rate 508, and a threshold 510. Serial number 504 and/or practice name 506 may be used for practice identification and/or description, which may be utilized by system administrators, developers, and the like when designing and/or configuring a best practices analyzer for analyzing RPA solutions in an automation tool and studio of an RPA generation application. Decay rate corresponds to a factor or coefficient used with an algorithm that causes exponential decay and penalization when a practice is violated, such as if instances of that practice occurring in an RPA solution meet or exceed threshold 510. Thus, threshold 510 includes a number of allowable instances before penalization begins according to the algorithm and decay rate.

Practices in diagram 500 may be identified and/or described by their practice name. In this regard, diagram 500 includes practices in RPA solution generation that are associated with unused user defined functions (UDFs), open tabs, a number of callouts (e.g., pop-ups, dialog boxes, open windows, etc.), a number of screen elements (SE), a number of variables, user types that are interconnected, steps that are overloaded, a number of workflows, event handlers (EHs) without actions, unused SE, empty UDFs, unused variables, and/or workflows without steps. Other practices may also be used.

Decay rate 508 is used to assign a severity to penalization of violating a best practice by exceeding threshold 510. For example, some practices may have higher processing costs and/or create more or larger performance issues during runtime when overused and/or if assets/workflows of the RPA solution do not adhere to that practice. In this regard, a 0.5 score may cause less of an exponential penalization for instances that exceed threshold 510 than a 1 or a 2 for decay rate 508. Threshold 510 may be implemented so that a certain number of assets and/or workflows are allowable before penalization. For example, variables may be required by RPA solutions, however, too many variables may cause performance issues and/or excessively consume processing resources. Thus, a set amount is allowable to generate the RPA solution, but providing a more lightweight and streamlined solution may require limiting the number of variables to a maximum set by threshold 510 for best practices.

Figure 6:
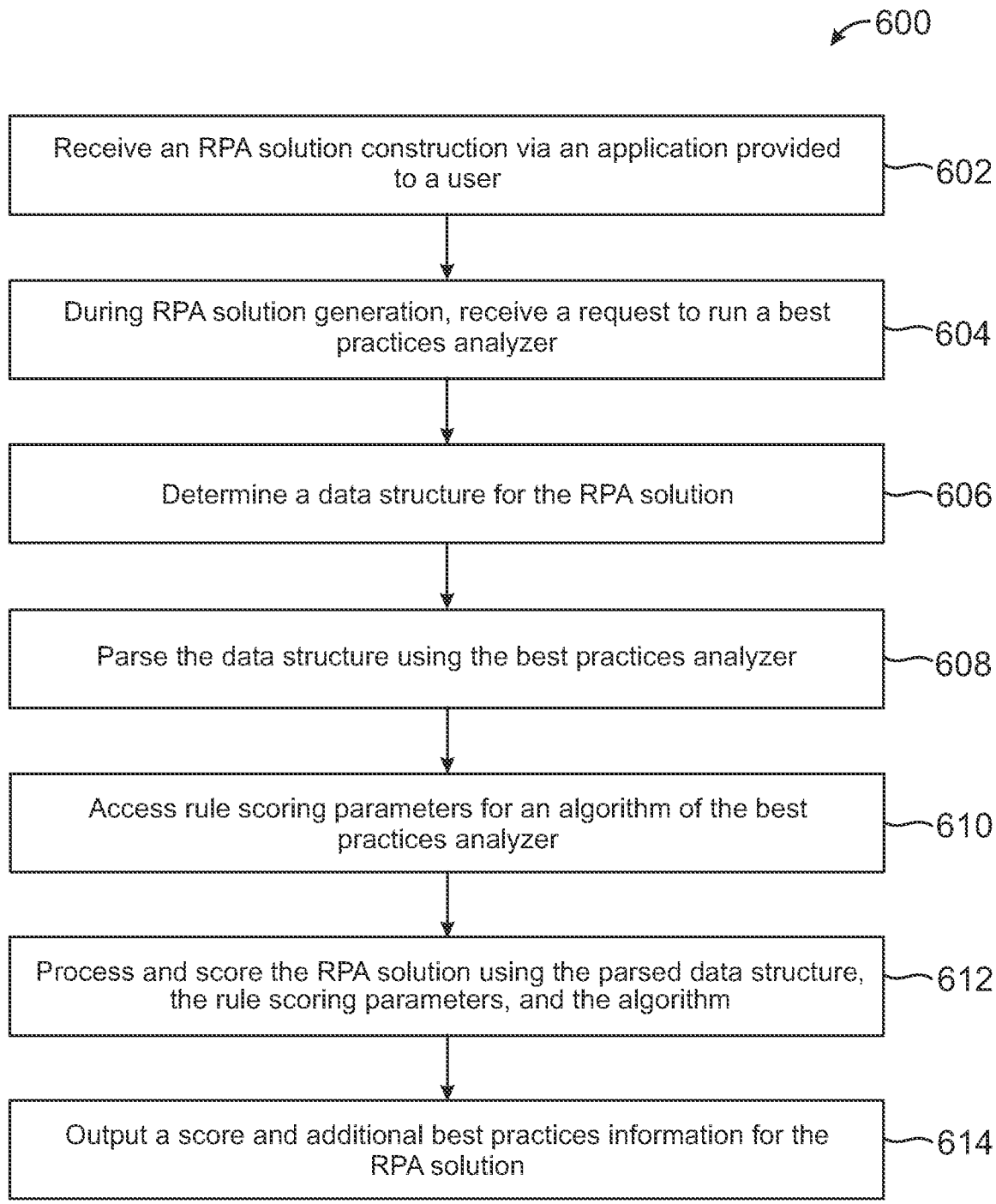
FIG. 6 is a simplified diagram of a method for providing scoring and analytics of RPA solutions in user interfaces of automation tools according to some embodiments.

FIG. 6 is a simplified diagram of a method 600 for providing scoring and analytics of RPA solutions in user interfaces of automation tools according to some embodiments. Note that one or more steps, processes, and methods described herein of method 600 may be omitted, performed in a different sequence, or combined as desired or appropriate. In some embodiments, the scoring of an RPA solution described in method 600 of FIG. 6 can be implemented and performed using RPA server 120. One or more of the processes 602-614 of method 600 may be implemented, at least in part, in the form of executable code stored on non-transitory, tangible, machine-readable media that when run by one or more processors may cause the one or more processors to perform one or more of the processes 602-614. In some embodiments, method 600 can be performed by one or more computing systems in environment 100 of FIG. 1.

At step 602 of method 600, an RPA solution construction is received via an application provided to a user. An automation studio may be provided in an application, such as a web-based application or device software application, which may allow a user to establish, set, and/or modify assets for RPA solution generation within workflows. The automation studio may therefore include tools, options, menus, and visualizations for adding, configuring, and/or deleting variables, user defined types, workflows, event handles, user defined functions, callouts, screen elements, and the like to RPA solutions. At step 604, during RPA solution generation, a request to run a best practices analyzer is received. In addition to the options to construct the RPA solution, a best practices analyzer may be offered, which may be executed in response to a request by the user. This initiates a process to score the RPA solution and/or provide recommendations and feedback for performance issues, unused items, and/or alerts.

At step 606, a data structure is determined for the RPA solution. The data structure may correspond to a JSON container or other structure having JSON objects for the RPA solution and corresponding practices for analysis using the algorithmic operations of the best practices analyzer. The data structure may be determined from a current application state at the time of the request to analyze the RPA solution for best practices. The current application state may be collected using an API interfacing with the application providing the automation studio. Thus, the RPA solution may be present in the automation studio for data collection by the API. At step 608, the data structure is parsed using the best practices analyzer. Parsing the data structure may include iterating over instances of each practice present in the data structure and RPA solution to determine a number of instances of the practice and compare that number of instances to a threshold allowable number of instances. In some embodiments, the algorithm may not penalize a score of the RPA solution if the instances do not meet or exceed the threshold. However, a penalty may be assessed in response to meeting or exceeding that threshold.

At step 610, rule scoring parameters for an algorithm of the best practices analyzer are accessed. The rule scoring parameters may include at least the practice for analysis, a decay rate that exponentially increases a penalty for the number of instances over the corresponding threshold, and a threshold number of allowable instances before penalty assessment for each practice. The algorithm may then utilize these parameters with the parsed data identifying the instances for each practice. At step 612, the RPA solution is processed and scored using the parsed data structure, the rule scoring parameters, and the algorithm. The algorithm may be invoked to calculate individual scores for each practice and then sum and/or average for a final score for the RPA solution. Thus, the best practices analyzer may iterate over the data structure for each practice when calculating the final score.

At step 614, a score and additional best practices information is output for the RPA solution. Outputting of the score and additional best practices information may be done in a user interface of the automation studio and/or a pop-up or displayable window. The score may be displayed as a score within a range, and further a descriptor or other measure may be used to describe the score (e.g., poor, fair, good, excellent when the range is segmented into four quartiles, however, other segments and/or descriptors may be used). Further, the score may be output with a "Performance Issues" section, which may identify a number of instances of each practice occurring in the RPA solution, as well as the threshold for each respective practice. This allows a user to view which practices are violated and the corresponding threshold exceeded, and which are not. An "Unused Items" section or tab may identify unused items, such as unused assets and/or workflows. Each unused item may correspond to a selectable link, which, on selection, may navigate to the corresponding unused item and/or delete the item automatically. Additionally, an "Alerts" section may identify any other performance issues of the RPA solution, such as display screen settings, open tabs, and the like.

As discussed above and further emphasized here, FIGS. 1, 2A, 2B, 3, 4A, 4B, 5, and 6 are merely examples of RPA server 120 and corresponding methods for providing a best practices analyzer with RPA solutions, which examples should not be used to unduly limit the scope of the claims. One of ordinary skill in the art would recognize many variations, alternatives, and modifications.

Figure 7:
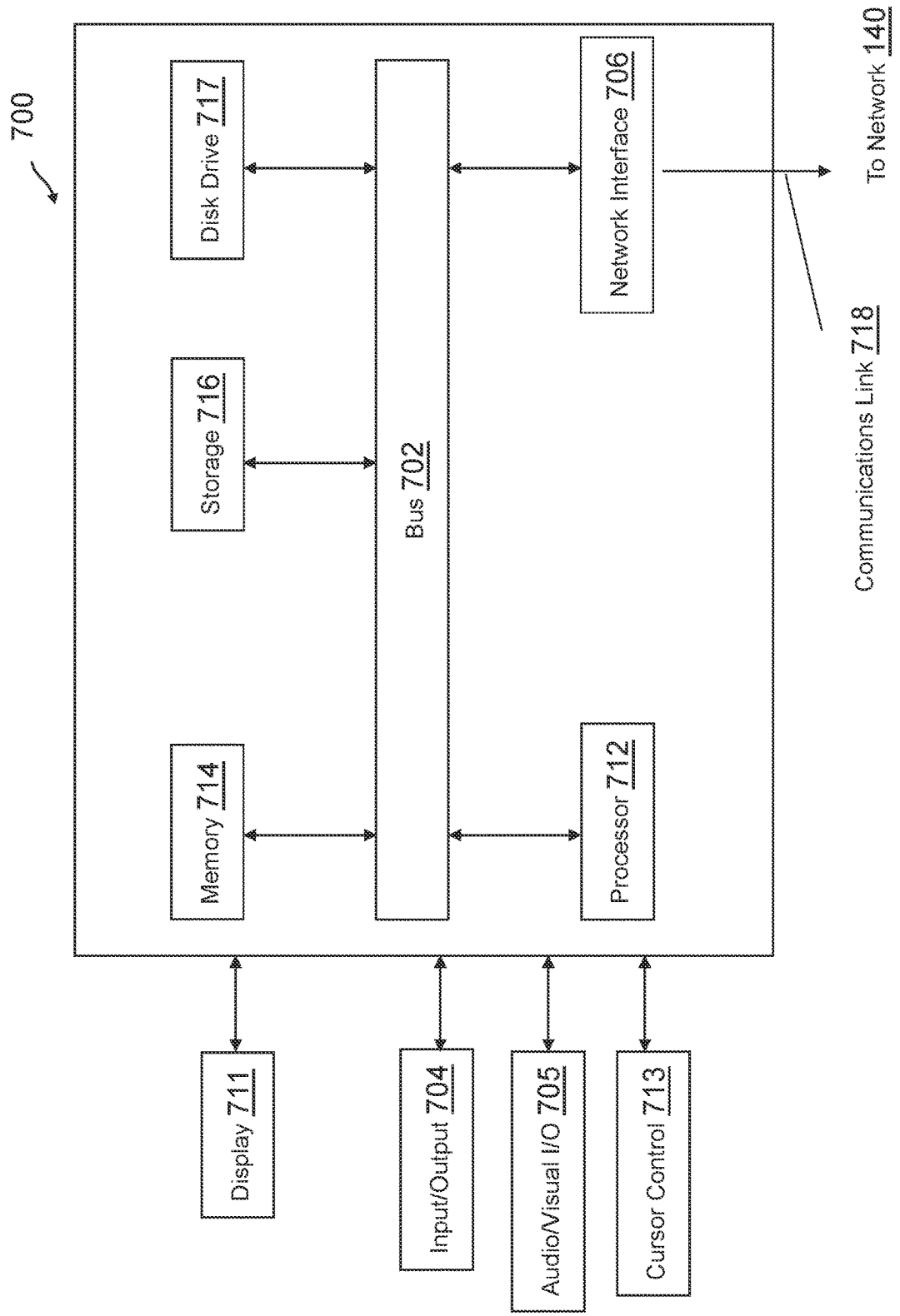
FIG. 7 is a simplified diagram of a computing device according to some embodiments.

FIG. 7 is a block diagram of a computer system 700 suitable for implementing one or more components in FIGS. 1 and 2, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, images, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An automation tool system configured to analyze data structures for robotic process automation (RPA) solutions, the automation tool system comprising:
   a processor and a computer readable medium operably coupled thereto, the computer readable medium comprising a plurality of instructions stored in association therewith that are accessible to, and executable by, the processor, to perform data structure scoring operations which comprise:
   receiving a data structure for an automated computing task for the RPA solutions of a computing system, wherein the data structure comprises one or more computing assets for one or more data processing workflows of the automated computing task that is generated using the automation tool system;
   parsing the data structure to identify the one or more computing assets and the one or more data processing workflows for the automated computing task;
   accessing rule scoring parameters for determining a set of best practices identified for construction of the automated computing task for the RPA solutions of the computing system;
   scoring the automated computing task for the RPA solutions for the computing system based on the parsing and the rule scoring parameters; and
   outputting, based on scoring the automated computing task, a score of the automated computing task for the data structure.

2. The automation tool system of claim 1, wherein scoring of the automated computing task comprises:
   determining an individual practice score for each of a plurality of RPA practices; and
   generating the score of the automated computing task based on the individual practice score for each of the plurality of RPA practices.

3. The automation tool system of claim 2, wherein determining the individual practice score for each of the plurality of RPA practices comprise:
   applying an exponentially scored penalty to a number of performance issues in each of the plurality of RPA practices; and
   calculating, based on the exponentially scored penalty to the number of performance issues, the individual practice score for each of the plurality of RPA practices.

4. The automation tool system of claim 1, wherein the data structure comprises an application state of the automated computing task for the RPA solutions in a JavaScript Object Notation (JSON) format having a plurality of JSON objects for the one or more computing assets in the one or more data processing workflows.

5. The automation tool system of claim 1, wherein the score of the automated computing task utilizes a plurality of scoring sections broken into at least one or more numerical quadrants, and wherein the score of the automated computing task is output as one of the plurality of scoring sections.

6. The automation tool system of claim 1, wherein the data structure scoring operations further comprise:

identifying at least one unused practice within the one or more data processing workflows of the automated computing task; and outputting the at least one identified unused practice with the score of the automated computing task.

7. The automation tool system of claim 6, wherein the data structure scoring operations further comprise:

providing, with the at least one identified unused practice, an operation to delete the at least one identified unused practice in the data structure using the automation tool system.

8. The automation tool system of claim 1, wherein the rule scoring parameters for determining the set of best practices are associated with at least one of a user defined function, an open tab in the data structure, an external callout to external data, a screen element, a number of variables, an interconnected user type, an overloaded step, a number of workflows, or an event handler without associated actions.

9. A method to analyze data structures for robotic process automation (RPA) solutions during RPA solution coding, which method comprises:

receiving a data structure for an automated computing task for the RPA solutions of a computing system, wherein the data structure comprises one or more computing assets for one or more data processing workflows of the automated computing task that is generated using an automation tool system;

parsing the data structure to identify the one or more computing assets and the one or more data processing workflows for the automated computing task;

accessing rule scoring parameters for determining a set of best practices identified for construction of the automated computing task for the RPA solutions of the computing system;

scoring the automated computing task for the RPA solutions for the computing system based on the parsing and the rule scoring parameters; and outputting, based on scoring the automated computing task, a score of the automated computing task for the data structure.

10. The method of claim 9, wherein scoring of the automated computing task comprises:

determining an individual practice score for each of a plurality of RPA practices; and generating the score of the automated computing task based on the individual practice score for each of the plurality of RPA practices.

11. The method of claim 10, wherein determining the individual practice score for each of the plurality of RPA practices comprise:

applying an exponentially scored penalty to a number of performance issues in each of the plurality of RPA practices; and calculating, based on the exponentially scored penalty to the number of performance issues, the individual practice score for each of the plurality of RPA practices.

12. The method of claim 9, wherein the data structure comprises an application state of the automated computing task for the RPA solutions in a JavaScript Object Notation (JSON) format having a plurality of JSON objects for the one or more computing assets in the one or more data processing workflows.

13. The method of claim 9, wherein the score of the automated computing task utilizes a plurality of scoring sections broken into at least one or more numerical quadrants, and wherein the score of the automated computing task is output as one of the plurality of scoring sections.

14. The method of claim 9, which further comprises:

identifying at least one unused practice within the one or more data processing workflows of the automated computing task; and outputting the at least one identified unused practice with the score of the automated computing task.

15. The method of claim 14, which further comprises:

providing, with the at least one identified unused practice, an operation to delete the at least one identified unused practice in the data structure using the automation tool system.

16. The method of claim 9, wherein the rule scoring parameters for determining the set of best practices are associated with at least one of a user defined function, an open tab in the data structure, an external callout to external data, a screen element, a number of variables, an interconnected user type, an overloaded step, a number of workflows, or an event handler without associated actions.

17. A non-transitory computer-readable medium having stored thereon computer-readable instructions executable to analyze data structures for robotic process automation (RPA) solutions for an automation tool system, the computer-readable instructions executable to perform data structure scoring operations which comprise:

receiving a data structure for an automated computing task for the RPA solutions of a computing system, wherein the data structure comprises one or more computing assets for one or more data processing workflows of the automated computing task that is generated using the automation tool system;

parsing the data structure to identify the one or more computing assets and the one or more data processing workflows for the automated computing task;

accessing rule scoring parameters for determining a set of best practices identified for construction of the automated computing task for the RPA solutions of the computing system;

scoring the automated computing task for the RPA solutions for the computing system based on the parsing and the rule scoring parameters; and outputting, based on scoring the automated computing task, a score of the automated computing task for the data structure.

18. The non-transitory computer-readable medium of claim 17, wherein scoring of the automated computing task comprises:

determining an individual practice score for each of a plurality of RPA practices; and generating the score of the automated computing task based on the individual practice score for each of the plurality of RPA practices.

19. The non-transitory computer-readable medium of claim 18, wherein determining the individual practice score for each of the plurality of RPA practices comprise:

applying an exponentially scored penalty to a number of performance issues in each of the plurality of RPA practices; and calculating, based on the exponentially scored penalty to the number of performance issues, the individual practice score for each of the plurality of RPA practices.

20. The non-transitory computer-readable medium of claim 17, wherein the data structure comprises an application state of the automated computing task for the RPA solutions in a JavaScript Object Notation (JSON) format having a plurality of JSON objects for the one or more computing assets in the one or more data processing workflows.

\* \* \* \* \*